(12) United States Patent
Dillon

(10) Patent No.: US 7,198,449 B2
(45) Date of Patent: Apr. 3, 2007

(54) COMBINE DUAL AUGER UNLOADER

(76) Inventor: Ben N. Dillon, 206 Greensprings Dr., Columbus, OH (US) 43235

( * ) Notice: Subject to any disclaimer, the term of this patent is extended or adjusted under 35 U.S.C. 154(b) by 393 days.

(21) Appl. No.: 10/891,928

(22) Filed: Jul. 15, 2004

(65) Prior Publication Data

US 2006/0045701 A1 Mar. 2, 2006

(51) Int. Cl.
*A01D 17/02* (2006.01)
(52) U.S. Cl. .................. 414/502; 414/813; 460/114
(58) Field of Classification Search ............... 414/526, 414/502, 505, 343, 812, 813; 56/14.6, 2.8, 56/16.6; 460/114, 119; 280/442, 443, 419
See application file for complete search history.

(56) References Cited

U.S. PATENT DOCUMENTS 2,691,455 A * 10/1954 Bailey et al. ............... 414/502
4,428,182 A * 1/1984 Allen et al. ................. 56/14.6
6,012,272 A * 1/2000 Dillon ......................... 56/14.6
6,233,911 B1 * 5/2001 Dillon ......................... 56/14.6
6,910,845 B2 * 6/2005 Dillon ......................... 414/502
7,040,980 B1 * 5/2006 Kestel ......................... 460/114
2002/0151335 A1 * 10/2002 McLeod ....................... 460/12

* cited by examiner

*Primary Examiner*—Charles A. Fox
(74) *Attorney, Agent, or Firm*—Mueller Smith & Matto

(57) ABSTRACT

Disclosed is an improved grain unloader for off-loading (unloading) grain from a grain bin carried by one or more of a combine or a grain cart. A second grain movement assembly is coupled in parallel to the first grain movement assembly so that both grain movement assemblies can simultaneously off-load the grain bin. A third grain movement assembly feeds the second grain movement assembly. The first and second grain movement assemblies move together from a stowage position to an unloading position. The third grain assembly can only feed the second grain transfer assembly when the second grain assembly is in the off-load position.

16 Claims, 9 Drawing Sheets

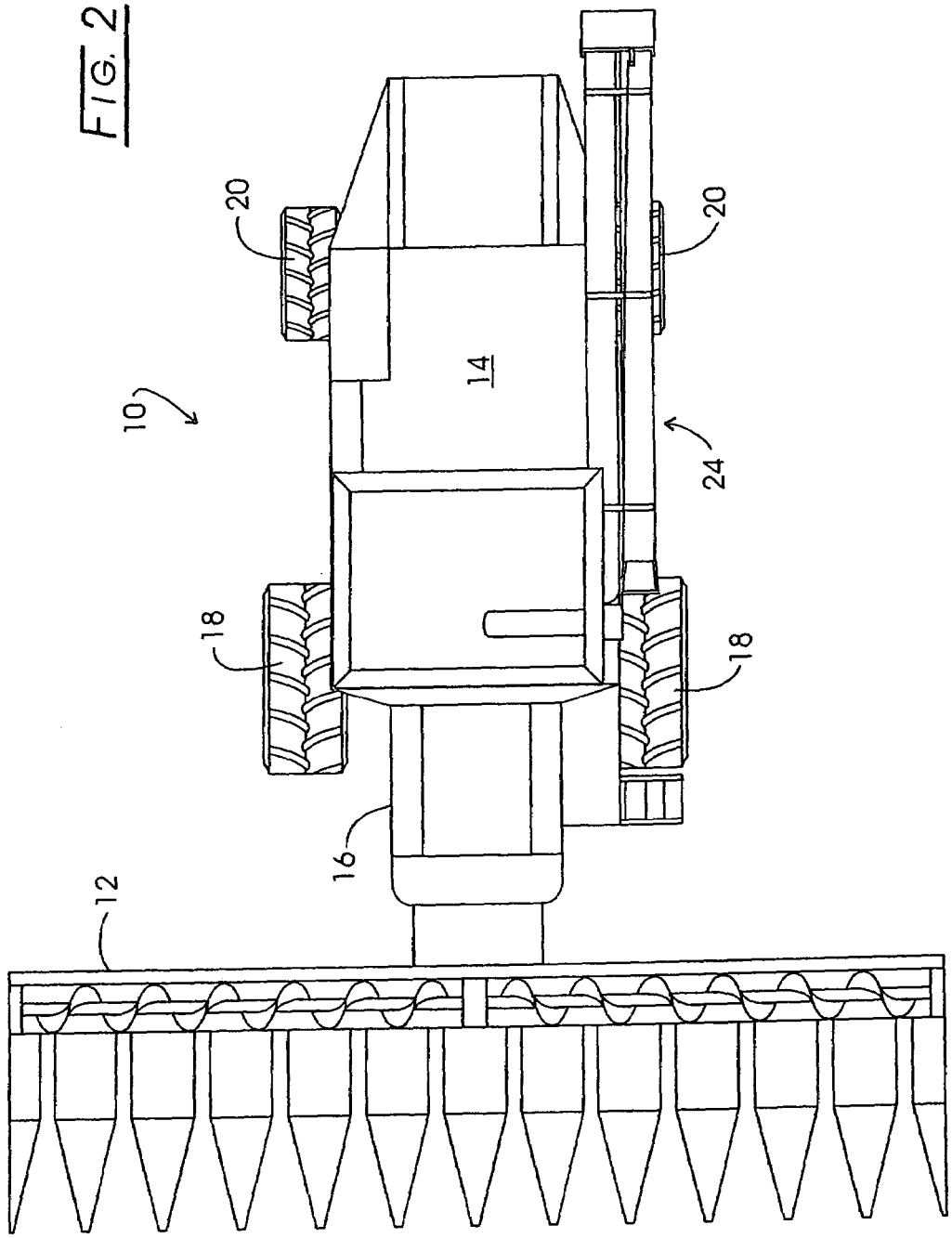

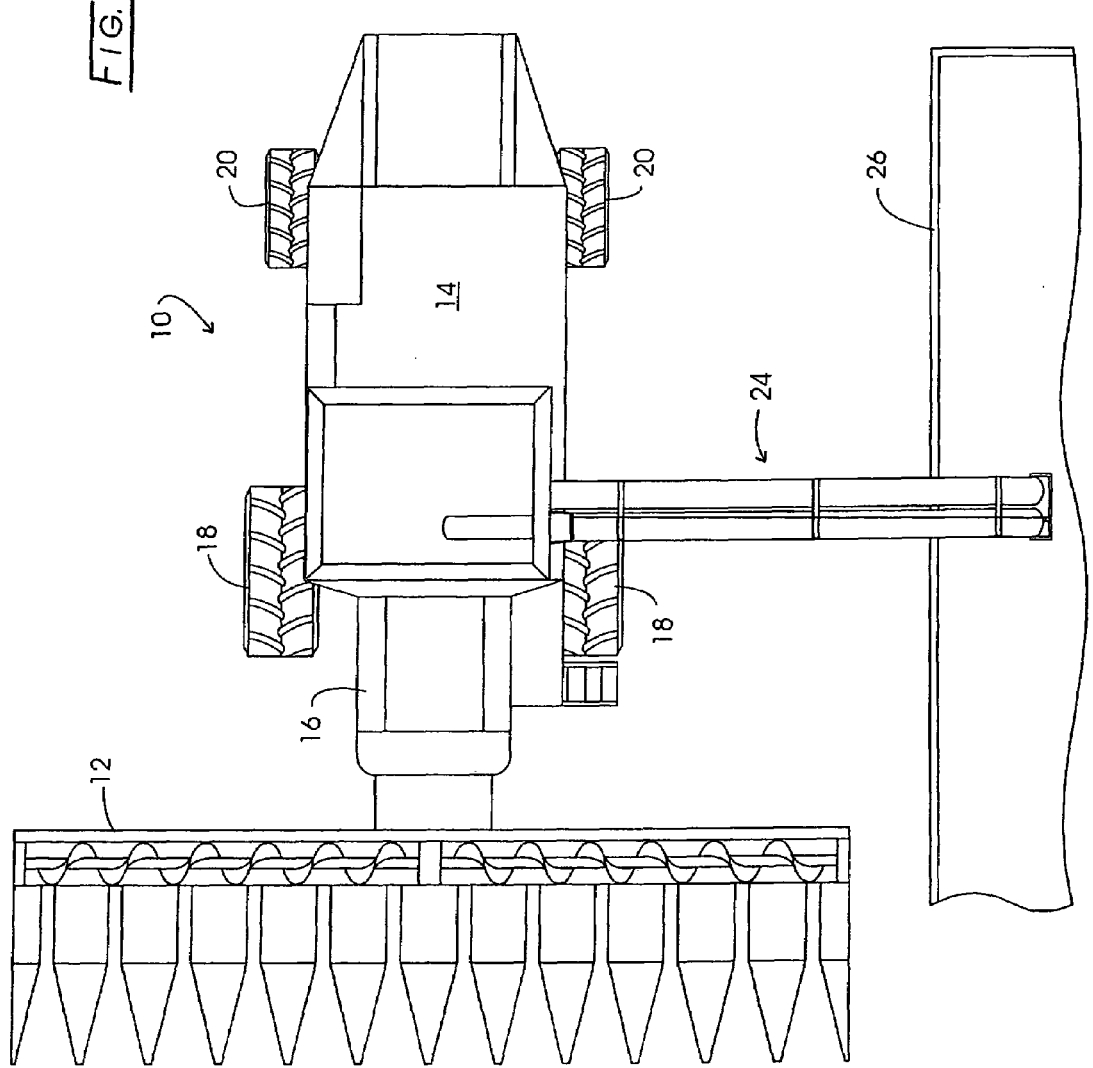

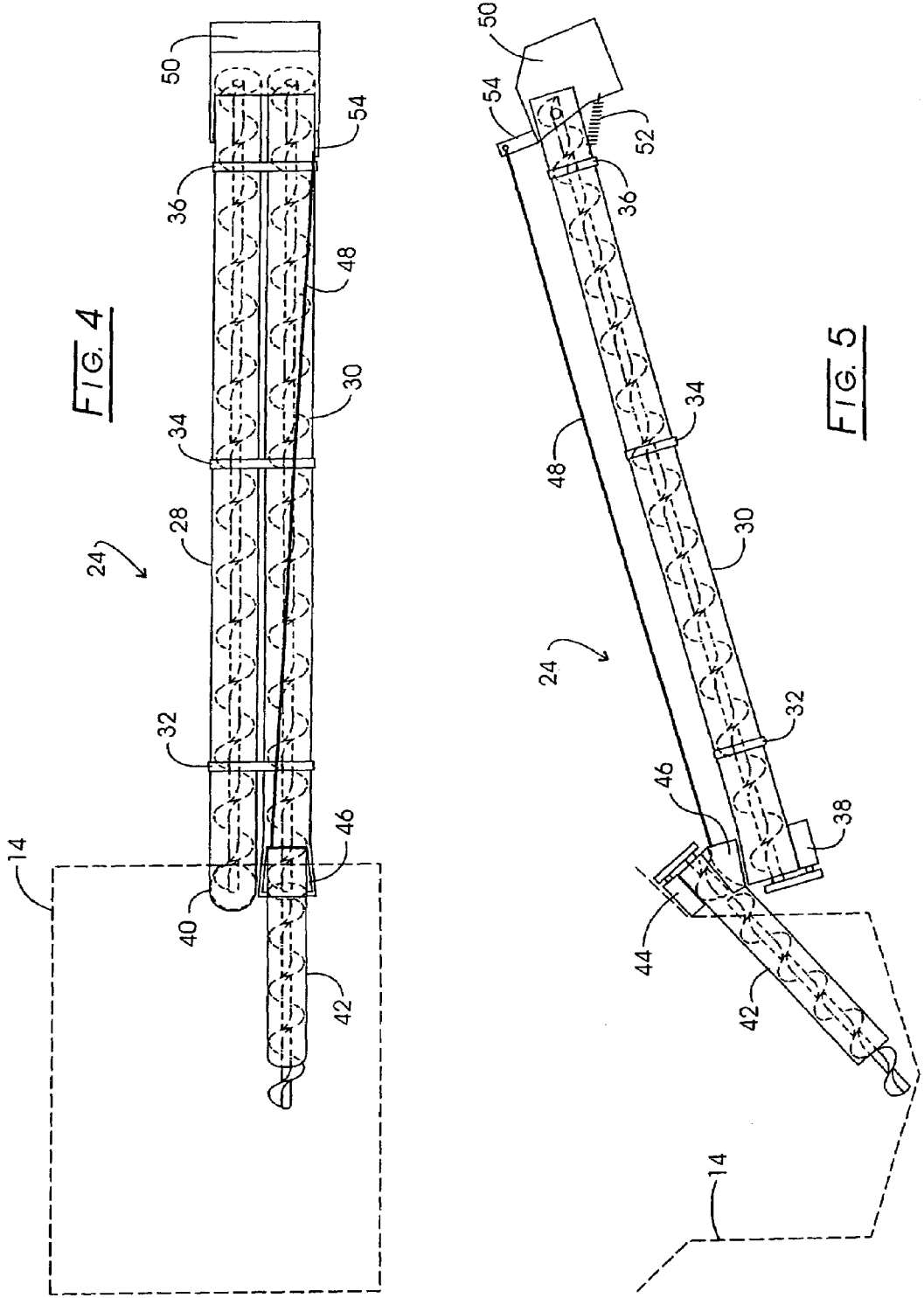

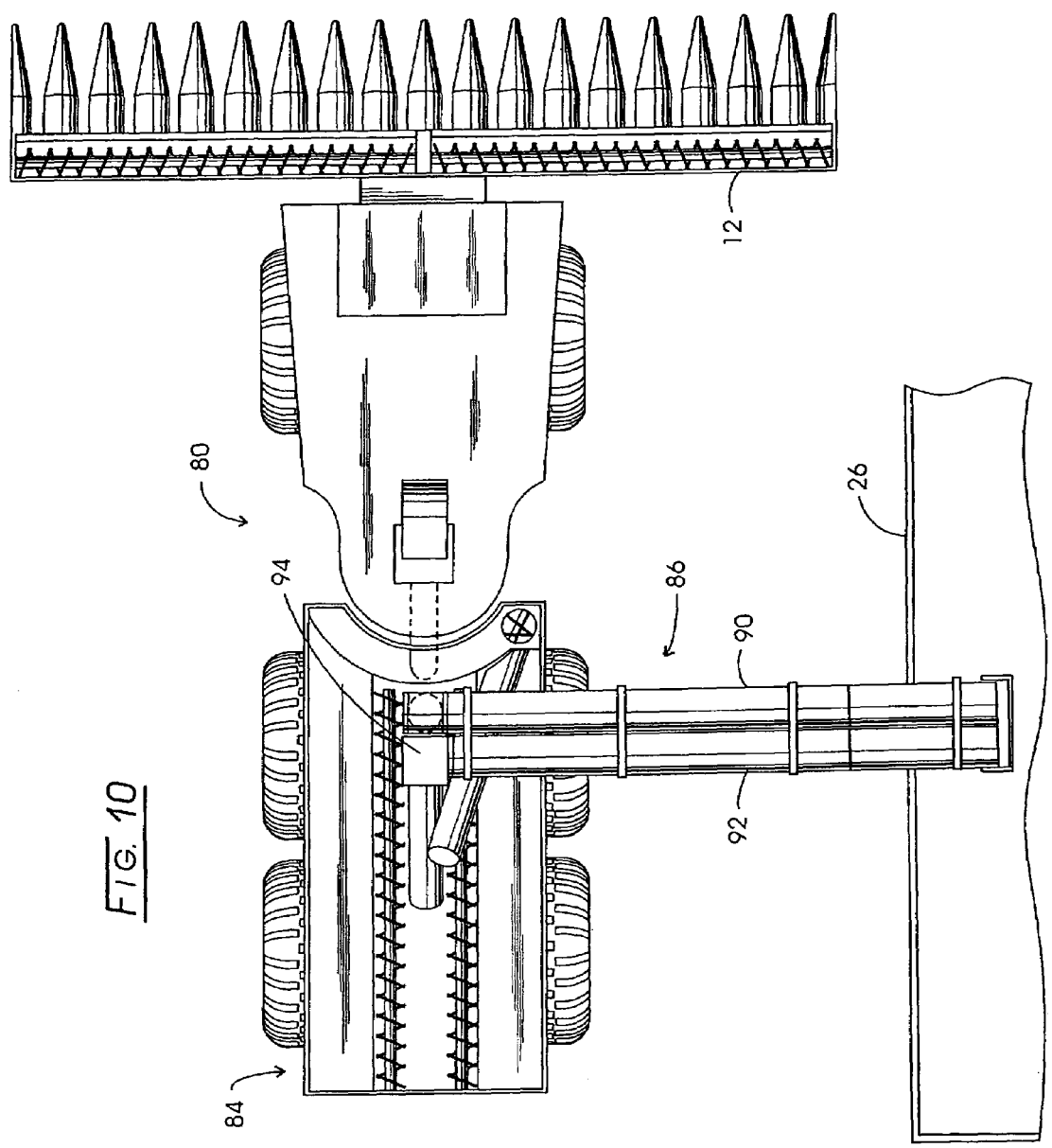

COMBINE DUAL AUGER UNLOADER

CROSS-REFERENCE TO RELATED APPLICATIONS

None

STATEMENT REGARDING FEDERALLY SPONSORED RESEARCH

Not applicable

BACKGROUND OF THE INVENTION

The present invention generally relates to combines or harvesters that require extra unloading capability resulting from, e.g., pulling a grain trailer, carrying an on-board high capacity grain bin, or like, and more particularly to a dual auger unloader for expeditiously off-loading grain therefrom.

Modern grain combines, such as are used to harvest corn, wheat, soybeans, etc., and corn pickers, have significantly increased their throughput capability. These increases have resulted from improvements such as wider cutting heads and increased number of row units per machine in the case of row crops such as corn. The threshing and grain separating capacity of the machines has increased in parallel by building larger machines with higher horsepower engines.

Concomitant therewith, the number of acres in the average North American farm has increased dramatically with crop fields becoming larger and longer. Fields with a row length of one-half mile have become quite common.

The result of these simultaneous trends is that the amount of harvested crop or clean grain produced in one round or two lengths of the field has increased dramatically. The harvested grain must be carried along by the harvesting system until the end of the field is reached where it is transferred into a bulk transportation vehicle such as a truck (tractor-trailer or semi) or wagon. Combines have an onboard grain hopper in which to store the harvested grain until the end of the field has been reached. Seed corn pickers typically pull a trailer or wagon, or a truck is driven along side them to receive the grain.

Due to increased combine throughput and long fields, virtually no combine commercially available today has sufficient capacity in its on-board hopper to store the corn harvested during one round of an 80 acre field or a field which is one-half mile in length with the crop yields typically found in the U.S. corn belt. The on-board primary storage hoppers are limited in capacity by the physical size of the machine and the total weight of the combine with a full hopper, which can be carried on 2 axles or 2 tracks in some cases.

Farmers and farm equipment manufacturers have addressed this problem by developing intermediate transport grain carts or trailers, which are pulled by a separate tractor and operator. The grain cart/tractor combination is stationed at the opposite end of the field from the road transport (bulk storage) vehicle or along the length of the field to receive the grain from the combine when its primary hopper is full and before the combine reaches the end of the field where the road transport vehicle is located. The traditional grain cart has self-unloading capability usually in the form of an auger, conveyor, or side hydraulic dump mechanism, which receives power from the tractor. The grain cart/tractor combination typically carries the grain to the end of the field and loads it into the road transport vehicle, such as a semi-truck. Examples of such grain wagons can be found in U.S. Pat. Nos. 5,0163,208, 5,340,265, and 5,409,344.

Grain cart capacities typically vary from 400 bushels to 1000 bushels. Therefore, a loaded grain cart and pulling tractor may weigh as much as 90,000 pounds. Repeated trips across the field by this large vehicle combination can produce additional soil compaction, particularly in wet conditions, which reduces future crop yields. This method of intermediate storage and movement of grain with the field incrementally adds one operator and significant capital cost to the harvesting process.

A significant advance in grain carts is disclosed in U.S. Pat. No. 5,904,365. Disclosed is a powered towing vehicle having steering wheels and a wheeled trailer is connected to the vehicle for its towing. The wheels of the trailer are connected to a source of power for generating forward and rearward movement of the trailer. These wheels also are connected to a source of power for turning such wheels in order to steer the trailer. These wheels further are connected to a sensor to sense the position of the trailer wheels as they are being steered. The steering wheels of the towing vehicle also are connected to a sensor to sense the position of the vehicle wheels as they are being steered. The trailer steering wheel sensor is displayed to an operator of the vehicle so that the vehicle operator knows the relative position of each of the steering wheels. The trailer steering power source is connected to the vehicle so that an operator of the vehicle can remotely steer the wheels of the trailer. Unloading of the grain takes place separately from both the combine hopper and from the grain cart.

The present invention is a basic improvement on the unloading of grain from a conventional combine, an articulated combine, both the combine (of any construction) hopper and from the grain cart of a combine and grain cart combination.

BRIEF SUMMARY OF THE INVENTION

Disclosed is an improved grain unloader for off-loading grain from a grain bin carried by one or more of a combine or a grain cart, wherein a first grain movement assembly having a grain receiving end and a grain off-loading end off-loads grain from said grain bin. A second grain movement assembly is coupled in parallel to the first grain movement assembly. The second grain movement assembly has a grain off-loading end disposed adjacent to the first grain movement assembly grain-off loading end and grain receiving end disposed adjacent to the first grain movement assembly grain receiving end. An inclined third grain movement assembly is cooperatively operable with the second grain movement assembly receiving end for transferring grain from the grain cart bin to the first grain movement assembly.

The first and second grain movement assemblies are movable from a stowage position where the third grain movement assembly is spaced apart from the second grain movement assembly receiving end to an off-loading position where the third grain movement assembly is adjacent to the second grain movement assembly receiving end for transferring grain in the grain bin from the third grain movement assembly to the second grain movement assembly for off-loading gain from the second grain assembly off-loading end concurrently with off-loading grain with the first grain movement assembly.

Advantages of the present invention include increased unloading capacity for both a combine grain bin and the grain cart bin. Another advantage is the ease in retrofitting existing combines and grain carts with the second and third grain transfer assemblies without changing the basic architecture of the combine or grain cart. These and other advantages will be readily apparent to those skilled in the art based on the disclosure set forth herein.

BRIEF DESCRIPTION OF THE DRAWINGS

For a fuller understanding of the nature and advantages of the present invention, reference should be had to the following detailed description taken in connection with the accompanying drawings, in which:

FIG. 2 is an overhead plan view of the combine of FIG. 1;

FIG. 3 is an overhead plan view of the combine of FIG. 2 with the novel grain unloading assembly combination in its unload or off-load position;

FIG. 4 is a overhead elevational view of the novel grain unloading assembly combination in its off-load position;

FIG. 5 is a side elevational view of the novel grain unloading assembly combination of FIG. 4;

FIG. 10 is an overhead plan view of the articulated combine and novel grain unloading assembly combination of FIG. 9 with the novel grain unload assembly in its off-load position.

The drawings will be described in greater detail below.

DETAILED DESCRIPTION OF THE INVENTION

The present invention is addressed to unloading grain bins rapidly and has applicability to extra capacity grain bins, grain bins that receive more grain that their rated capacity, and the like. Such grain bins most often are carried by combines and grain carts. For present purposes combine and harvester are used interchangeably and no limitation should be implied by use of either term, as an apparatus that harvests grain in the field is broadly meant. So too, there no limitation of the term grain cart should be implied, as grain carts carry a grain bin and can be towed by a combine. Grain carts also can be powered and steerable, such as is disclosed in U.S. Pat. No. 5,904,365. While the invention can be applied to virtually any conventional combine, it has special applicability to combines having grain bins of up to 1000 to 1200 bushel or more capacity, such as are disclosed in one or more of the following patents: U.S. Pat. Nos. 6,012,272, 6,125,618, 6,339,917, 6,604,351, 6,606,844, 6,604,995, 6,604,350, 6,484,485, 6,612,101, 6,233,911, 6,240,711, and 6,167,982; and U.S. Ser. Nos. 10/247,249, filed Sep. 19, 2002 (now U.S. Pat. No. 6,910.845) and 10/379,957, filed Mar. 5, 2003.

Figure 1:
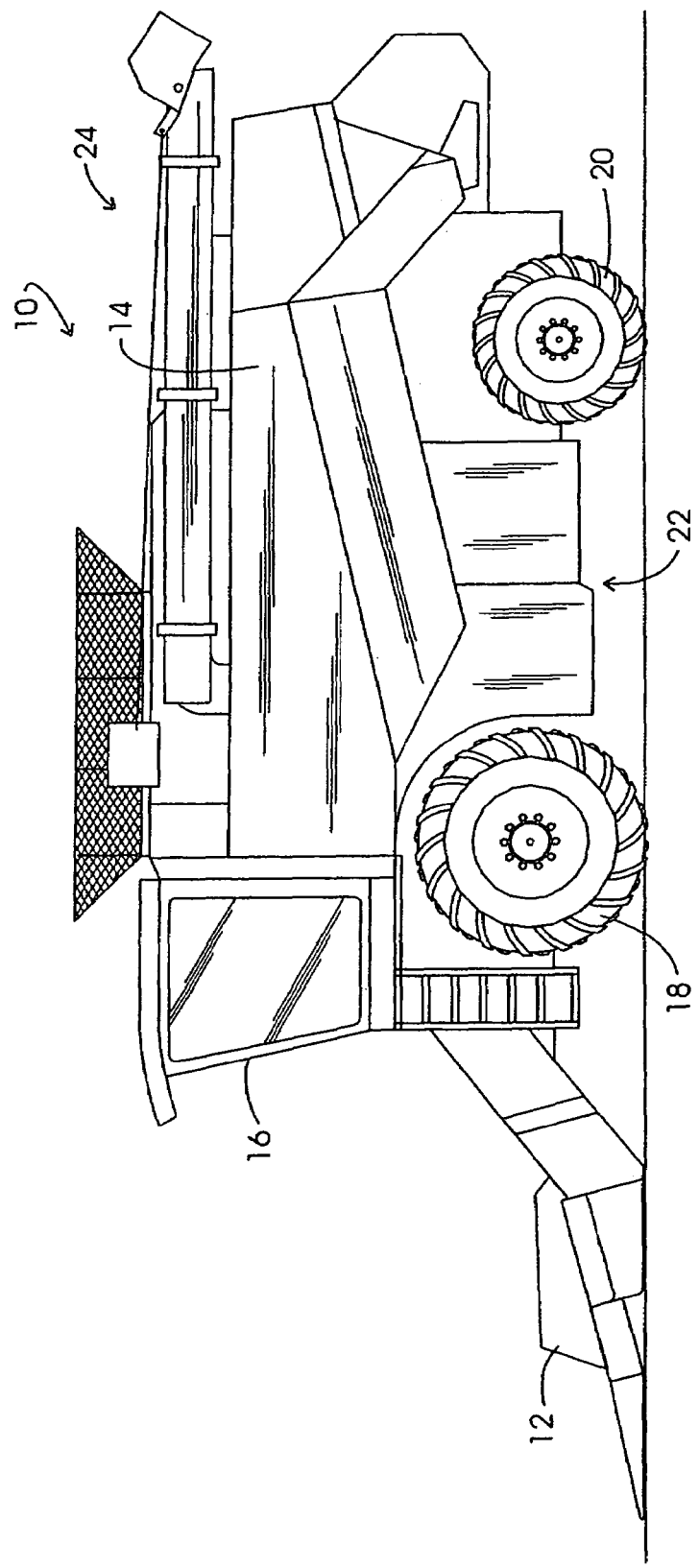
FIG. 1 is a side elevational view of a conventional combine fitted with the novel grain unloading assembly combination in its stowage position.

Referring initially to FIGS. 1 and 2, a combine, 10, conventional in construction is shown. Combine 10 carries a conventional corn head, 12, at its forward end, an onboard grain storage bin, 14, an operator cab, 16, a pair of forward wheels, 18, a pair rearward wheels, 20, a grain cleaner assembly, 22, and the novel grain unload assembly combination, 24, in its stowed (non-operating) position. Combine 10 has a variety of additional features conventional or unconventional in nature. No further description of combine 10 is deemed necessary for the skilled artisan.

In FIG. 3, grain unload assembly combination 24 has been extended to an off-load (unload) position wherein the discharge ends of grain unload assembly combination 24 has been positioned over a trailer, 26, of an over-the-road semi or tractor-trailer for transferring grain from grain bin 14 into trailer 26. The unloading rate of grain unload assembly combination 24 can be a least doubled by using two unload grain conveyer assemblies. Effective grain unloading by grain unload assembly combination 24 occurs with combination 24 being extended perpendicular to trailer 26, which may translate into combine 10 and trailer 26 being parked in a parallel relationship during the grain unloading.

FIGS. 4 and 5 show grain unload assembly combination 24 in greater detail. In particular, a primary grain movement assembly, 28, is standard equipment on combine 10. It is the unloading capacity of primary grain movement assembly 28 that is being increased in accordance with the precepts of the present invention. To that end, a secondary grain movement assembly, 30, is coupled in parallel relationship to primary grain movement assembly 28. Such coupling may be accomplished by a variety of techniques. One such technique depicted in the drawings has support flanges, 32, 34, and 36, coupling primary grain movement assembly 28 to secondary grain movement assembly 30. These coupling flanges ensure that both grain movement assemblies 28 and 30 will move together from a stowed position or station to an unload position. Essentially, secondary grain movement assembly 30 now will follow or shadow the movement of primary grain assembly 28.

All grain assemblies are shown as augers in the drawings; although, the skilled artisan will appreciate that conveyors or other grain movers may be used. Augers, then, are illustrative grain movers and are not a limitation of the present invention. A motor (not shown) powers primary grain auger assembly 28. A motor, 38, powers secondary grain auger assembly 30. Grain is fed to primary auger assembly 28 by a vertical or upstanding auger assembly, 40, which again is supplied with combine 10. An inclined auger assembly, 42, feeds grain to secondary auger assembly 30 and is powered by a motor, 44. The upper end of covered inclined auger assembly 42 is open at the bottom for dumping grain in auger assembly 30. A hood or flange assembly, 46, mates when secondary auger assembly 30 moves from its stowed position to its unload position for ensuring that grain is dumped from auger assembly 42 into auger assembly 30 with minimal spilling of grain. A limit switch, not shown, is tripped when secondary auger assembly 30 is in the unload position, as is primary auger assembly 28. This limit switch also causes motor 44 to operate to commence feeding grain via auger assembly 42 to secondary auger assembly 30. When auger pair 28/30 move from the unload position to the stowed position, this same limit switch causes motor 44 to shut off. Auger assemblies 28 and 30 turn off and on together. Any motor or power source in this invention may be hydraulic, electric, pneumatic, or other suitable motive source.

In order to support the extra weight of secondary auger assembly 30, a cable assembly, 48, is attached to a mast assembly, 54, located near the pivot point of primary auger assembly 28. The other end of cable assembly 48 is attached either to primary auger assembly 28, to secondary auger assembly 30, or to both. In the drawings, cable assembly 48 is attached to secondary auger assembly 30. Cable assembly 48 can be a cable, cable rod, chain, or other appropriate weight supporting member.

Since grain unloading will be facilitated by the grain dumping vertically down into trailer 26, a pivotable hood, 50, surmounts the unload ends of auger assemblies 28 and 30. Hood 50 may be constructed of plastic, metal, or other suitable material, optionally lined with a soft belting to minimize grain bouncing as it travels at high velocity. Hood 50 is held in position during grain unloading by a spring, 52, attached to auger assembly 30 and a spring, not shown, attached to grain auger assembly 28. When auger assembly pair 28/30 moves by pivoting from the unload position to the stowed position, hood 50 retracts upward, because cable assembly 48 includes an eccentrically mounted pulley assembly, 52. Retracting hood 50 ensures that it will clear any portion of combine 10.

Figure 6:
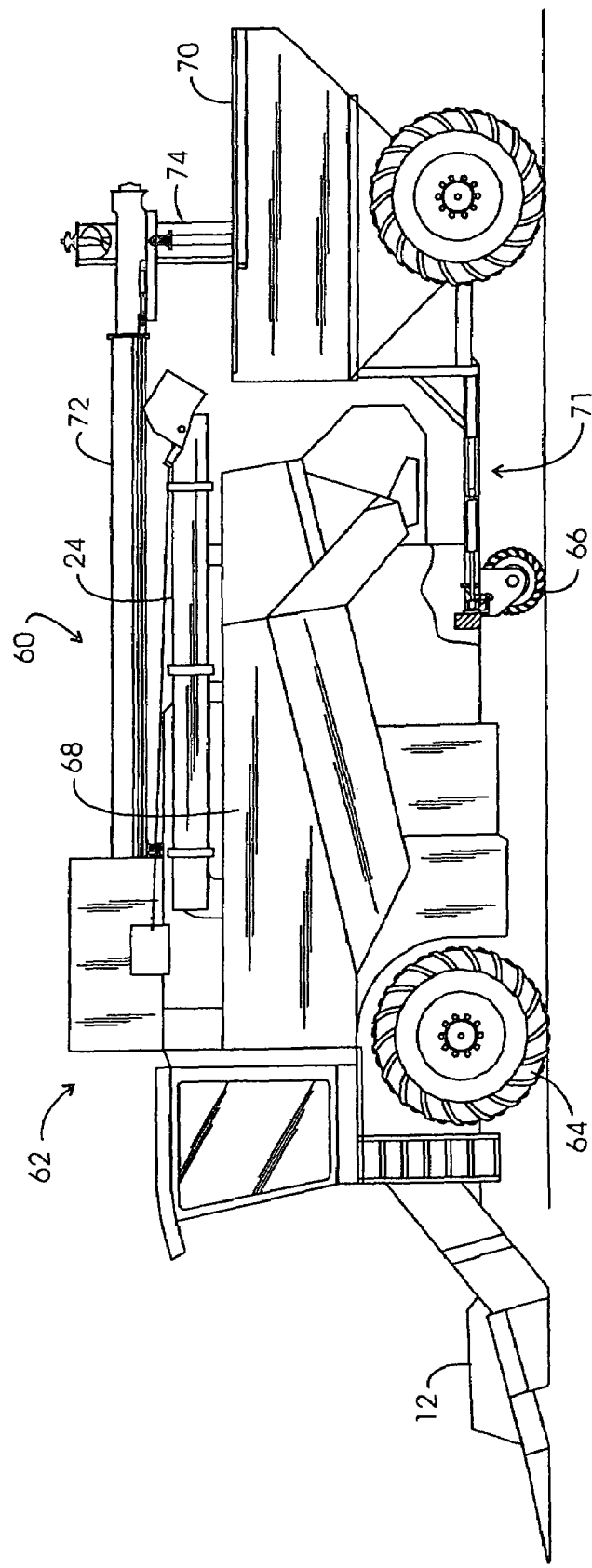
FIG. 6 is a side elevational view of a combine and grain cart constructed in accordance with Ser. No. 10/379,957, filed Mar. 5, 2003 and having a single grain unloading system in accordance with Ser. No. 10/247,249, filed Sep. 19, 2002 now U.S. Pat. No. 6,910,845, and which has been modified with the novel grain unloading assembly combination disclosed herein.
Figure 7:
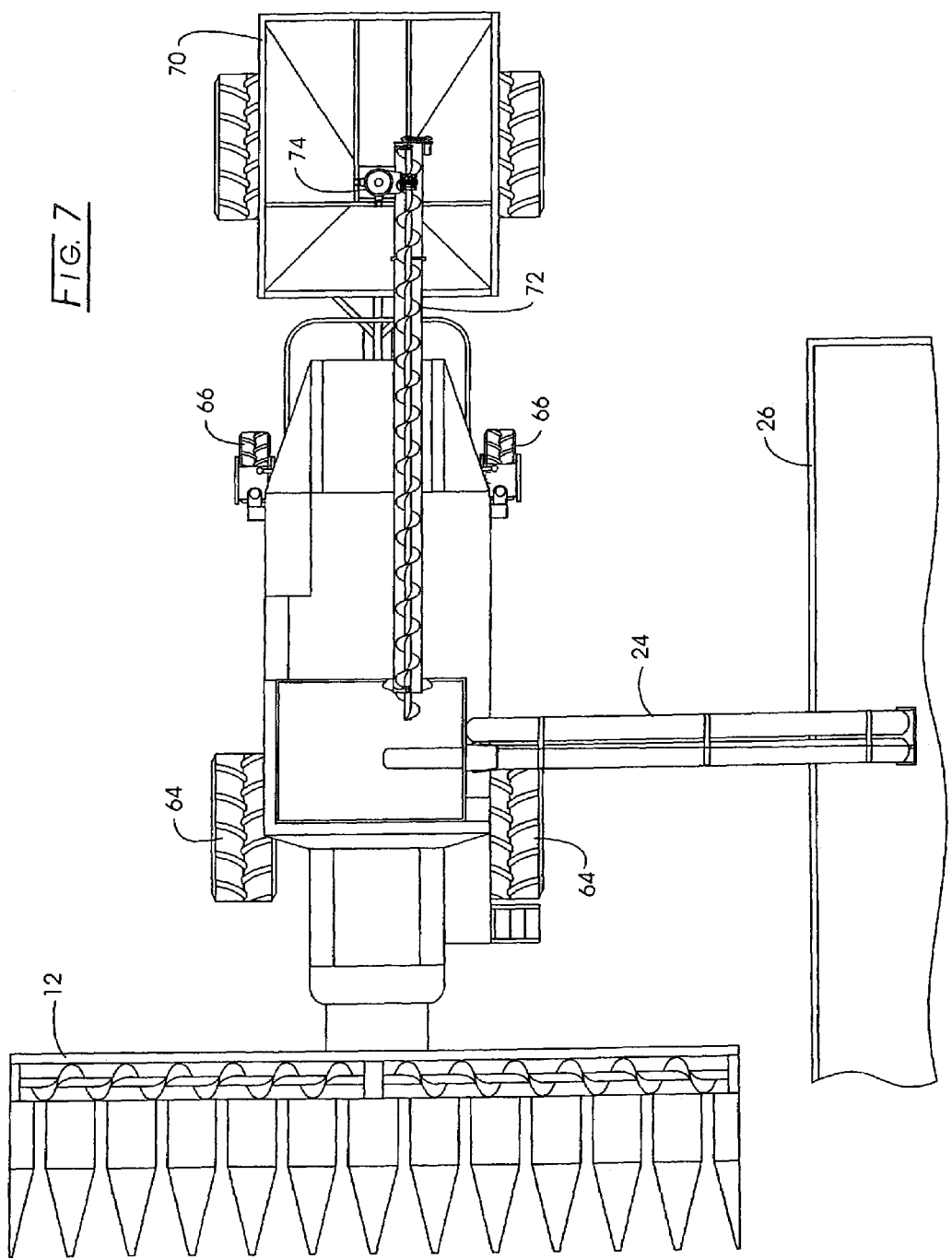
FIG. 7 is an overhead plan view of the combine and grain cart of FIG. 6 with the novel grain unloading assembly combination in its unload or off-load position.

FIGS. 6 and 7 depict a combine and grain cart, which may be conventional in construction or may be constructed in accordance with Ser. No. 10/379,957, filed Mar. 5, 2003, and which is fitted with the dual grain unloading assemblies, as disclosed herein. Briefly, Ser. No. 10/379,957 discloses an articulated harvester, 60, that includes a powered harvester, 62, having a pair of forward wheels or tracks, 64, having a pair of rotatable rearward caster wheels, 66, and carrying an on-board harvester grain bin, 68, for housing harvested grain. Harvester 62 tows a grain cart, 70, which carries a grain cart bin for housing harvested grain. A joint assembly, 71, interconnects harvester 62 and grain cart 70. Joint assembly 71 includes a grain cart tongue that mates with harvester 62. An articulation cylinder assembly connects harvester 62 and grain cart 70 tongue in the region of joint assembly 71. Bi-directional, biased guide rods connect between the grain cart tongue and caster wheels 66. Grain cart 70 may be steerable and/or powered. Harvester 62 may be steerable by its pair of forward wheels 64 or tracks (not shown). A conventional harvester and grain cart assembly can be converted into the novel articulated harvester with this invention.

Articulated harvester 60, regardless of construction, is fitted with a single grain unloading system in accordance with Ser. No. 10/247,249, filed Sep. 19, 2002. Such unloading system transfers grain from grain cart 70 into combine bin 68 for unloading of all grain. The inventive dual grain unloading assembly combination is ideally suited for this harvester construct due to the extra amount of grain required to be unloaded. Indeed, articulated harvester 60 is fitted with grain unload assembly combination 24, as described above.

Briefly, the unloading system of Ser. No. 10/247,249 (now U.S. Pat. No. 6,910,845) includes a generally horizontally disposed first grain movement assembly, 72, which is pivotally connected within combine grain bin 68 and pivotally connected within grain cart bin 70 and disposed for reciprocally transporting grain between the combine grain bin and the grain cart bin. A generally vertically disposed second grain movement assembly, 74, is cooperatively operable with first grain movement assembly 72 for transferring grain from grain cart bin 70 to first grain movement assembly 72 and thence to combine grain bin 68. Off-loading grain movement assembly 24 is disposed for off-loading grain only from combine grain bin 68.

Figure 8:
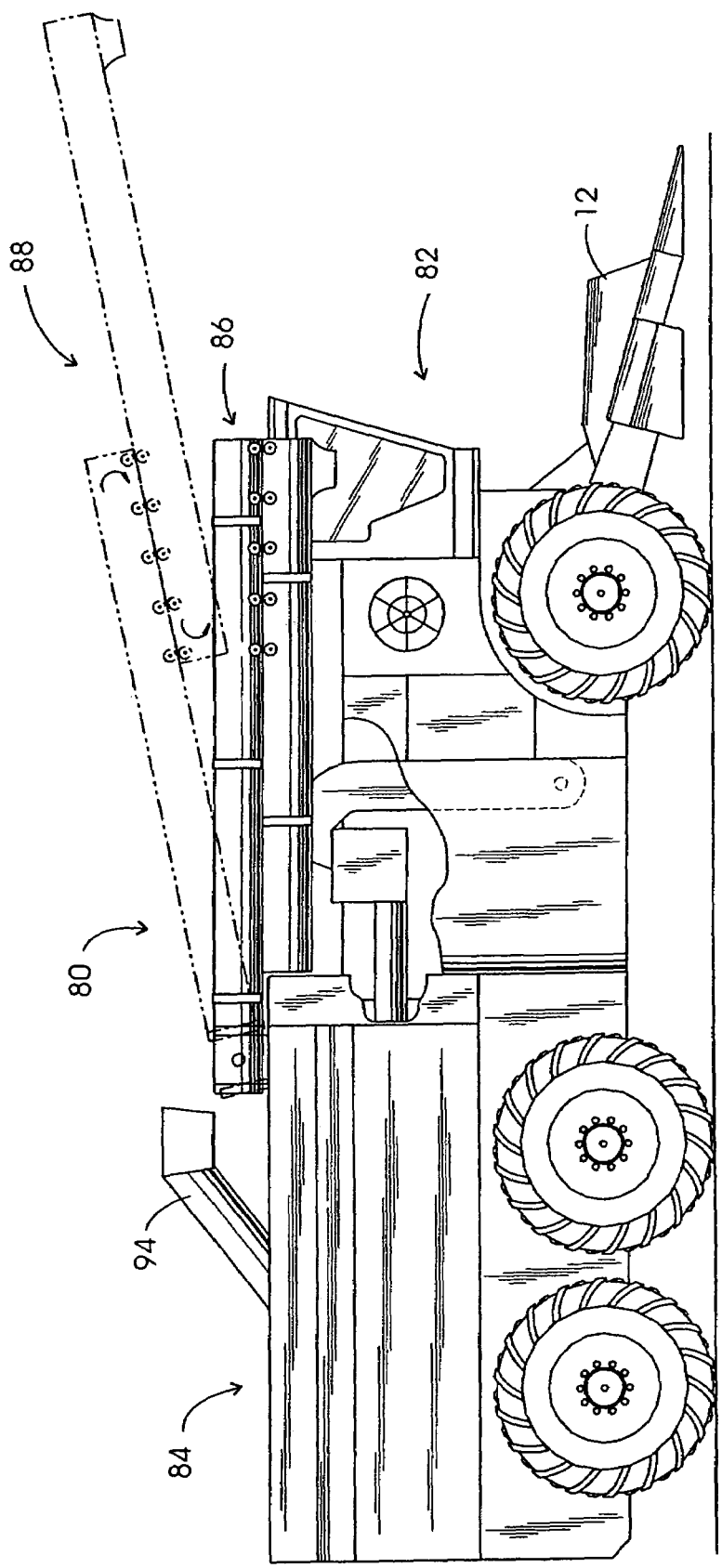
FIG. 8 is a side elevational view of an articulated combine, such as constructed in accordance with U.S. Pat. No. 6,012,272, which has been modified with the novel grain unloading assembly combination in its stowage position.
Figure 9:
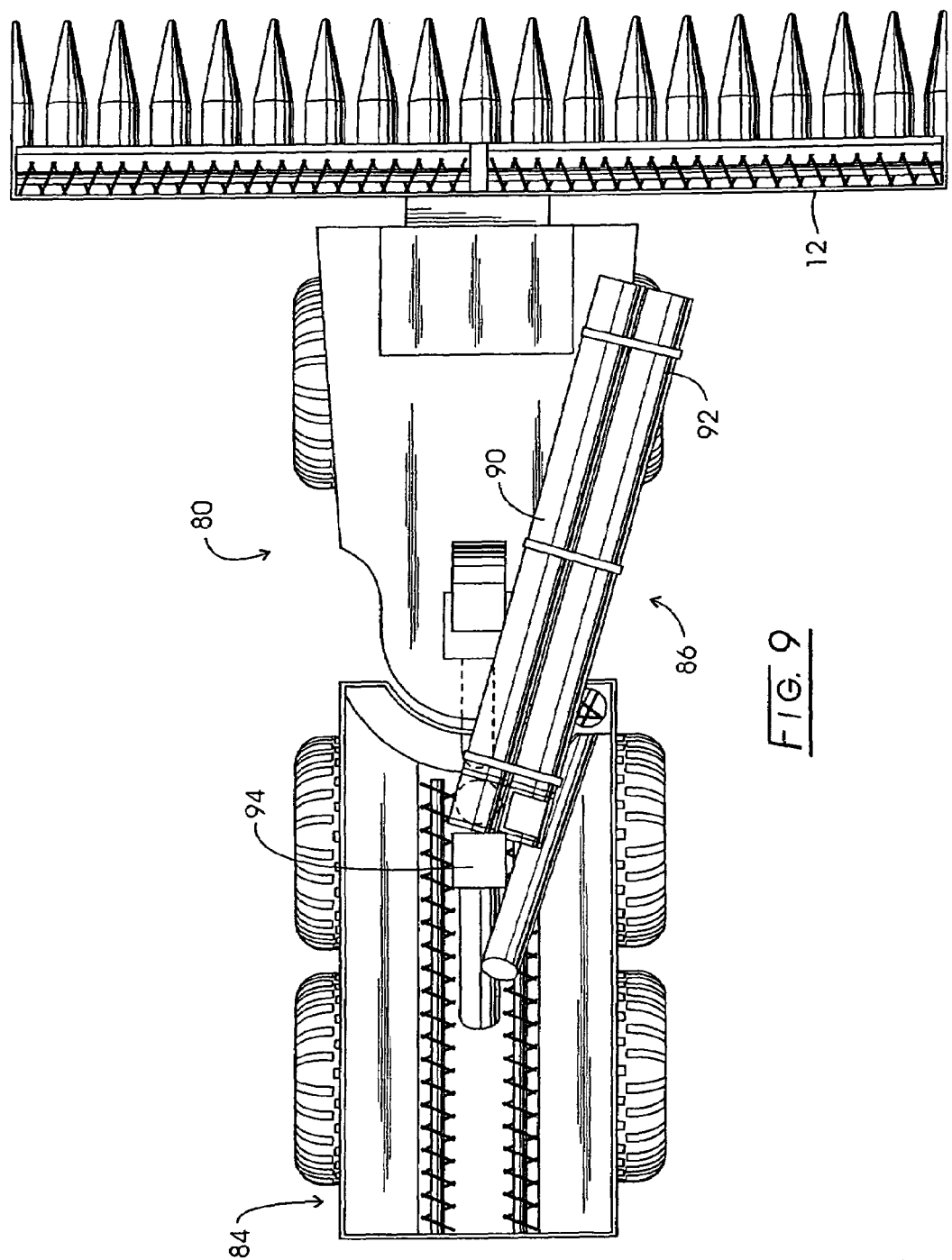
FIG. 9 is an overhead plan view of the articulated combine and novel grain unloading assembly combination of FIG. 8.

The combine shown in FIGS. 8–10 is an articulated combine, preferably constructed in accordance with one or more of U.S. Pat. Nos. 6,012,272, 6,125,618, 6,339,917, 6,604,351, 6,606,844, 6,604,995, 6,604,350, 6,484,485, 6,612,101, 6,233,911, 6,240,711, or 6,167,982. An articulated combine, 80, generally is composed of a forward unit, 82, having an operator's cab, an engine, a grain harvesting assembly, a grain transfer assembly, and being devoid of an on-board grain bin; and a rearward unit, 84, jointedly attached to forward unit 82 and having, steerable and powered wheels, an on-board grain bin for receiving grain from the forward section grain transfer assembly, and a grain off-loading assembly. Forward unit 82 is powered and may be steerable. The grain transfer assembly, joint, and grain off-loading assembly and controls, form other disclosures in the cited patents.

With the increased grain storage capacity of combine 80, the need to increase grain unload capacity is called into issue. The inventive dual auger unloading assembly, then, is ideally suited for use with the articulated combine illustrated in FIGS. 8–10 and disclosed in the patents cited above. To that end, articulated combine 80 is fitted with a grain unload assembly combination, 86, shown in the stationary position and in an extended position in phantom, 88. Grain unload assembly 86 is a combination of an extensible grain conveyor, 90, native to articulated combine 80 with a second extensible grain conveyor, 92, affixed thereto. The pair of extensible conveyors can be raised, as shown in phantom, and rotated outwardly to unload grain stored in rearward unit 84. An inclined auger assembly, 94, extends upwardly from the onboard grain bin in rearward unit 84 and mates with the secondary conveyor assembly. This operation is substantially like the operation of grain unload assembly combination 24, described above. To that end, the use of separate power sources for conveyors 90, 92, and 94, the use of a hood, cable assembly, limit switch for conveyor 92, and the like, can be adapted for use with grain unload assembly combination 86.

Thus, the inventive grain unload assembly combination has wide flexibility in its ability to be adapted for use with virtually any combine, grain cart, or combination thereof. While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. An improved grain unloader for off-loading grain from a grain bin carried by one or more of a combine or a grain cart, wherein a primary grain movement assembly having a grain receiving end and a grain off-loading end off-loads grain from said grain bin, the improvement which comprises:

(a) a secondary grain movement assembly coupled in parallel to said first grain movement assembly and having a grain off-loading end disposed adjacent to said first grain movement assembly grain off-loading end and grain receiving end disposed adjacent to said first grain movement assembly grain receiving end; and (b) an inclined third grain movement assembly disposed in said grain bin and being cooperatively operable with said secondary grain movement assembly receiving end for transferring grain from said grain cart bin to said second grain movement assembly, said primary and secondary grain movement assemblies being movable from a stowed position where said third grain movement assembly is spaced apart from said secondary grain movement assembly receiving end to an off-loading position where said third grain movement assembly is adjacent to said secondary grain movement assembly receiving end for transferring grain in said grain bin from said third grain movement assembly to said secondary grain movement assembly for off-loading gain from said secondary grain assembly off-loading end concurrently with off-loading grain with said primary grain movement assembly.

2. The improved grain unloader of claim 1, wherein all of said grain movement assemblies comprise auger assemblies.

3. The improved grain unloader of claim 2, wherein said auger assemblies are covered.

4. The improved grain unloader of claim 1, wherein said primary grain movement assembly grain off-loading end and said secondary grain movement grain off-loading end both are covered by a pivotable hood.

5. The improved grain unloader of claim 1, wherein one or more of said primary grain movement assembly or said secondary grain movement assembly is connected to said combine by a cable assembly.

6. The improved grain unloader of claim 1, wherein each of said grain movement assemblies are separately powered by a power source.

7. The improved grain unloader of claim 1, wherein said combine is an articulated combine.

8. The improved grain unloader of claim 1, wherein said combine has an on-board grain bin and tows a grain cart having an on-board grain bin, wherein and said grain cart carries a grain transfer assembly that transfers grain from said grain cart grain bin to said combine grain bin for off-loading.

9. An improved method for off-loading grain from a grain bin carried by one or more of a combine or a grain cart, wherein a primary grain movement assembly having a grain receiving end and a grain off-loading end off-loads grain from said grain bin, the improvement which comprises the steps of:

(a) coupling a secondary grain movement assembly in parallel to said first grain movement assembly, wherein said secondary grain movement assembly has a grain off-loading end disposed adjacent to said first grain movement assembly grain off-loading end and grain receiving end disposed adjacent to said first grain movement assembly grain receiving end, said primary and secondary grain movement assemblies movable from a stowed position to an off-loading position;

(b) disposing an inclined third grain movement assembly in said grain bin, wherein said third grain movement assembly is spaced apart from said secondary grain movement assembly receiving end when said second grain transfer assembly is in a stowed position and wherein said third grain movement assembly is adjacent to said secondary grain movement assembly receiving end when said second grain transfer assembly is in an off-loading position;

(c) moving said primary and secondary grain movement assemblies from said stowed position to said off-loading position where said third grain movement assembly is adjacent to said secondary grain movement assembly receiving end; and (d) transferring grain in said grain bin from said third grain movement assembly to said secondary grain movement assembly for off-loading gain from said secondary grain assembly off-loading end concurrently with off-loading grain with said primary grain movement assembly.

10. The improved method of claim 9, wherein all of said grain movement assemblies comprise auger assemblies.

11. The improved method of claim 10, wherein said auger assemblies are covered.

12. The improved method of claim 9, wherein said primary grain movement assembly grain off-loading end and said secondary grain movement assembly grain off-loading end both are covered by a pivotable hood.

13. The improved method of claim 9, wherein one or more of said primary grain movement assembly or said secondary grain movement assembly is connected to said combine by a cable assembly.

14. The improved method of claim 9, wherein each of said grain movement assemblies are separately powered by a power source.

15. The improved method of claim 9, wherein said combine is an articulated combine.

16. The improved method of claim 9, wherein said combine has an on-board grain bin and tows a grain cart having an on-board grain bin, wherein and said grain cart carries a grain transfer assembly that transfers grain from said grain cart grain bin to said combine grain bin for off-loading.

* * * * *